United States Patent Office 2,809,184
Patented Oct. 8, 1957

2,809,184
PROCESS FOR CURING GLYCIDYL POLYETHERS AND PRODUCTS PRODUCED THEREBY

Stanley H. Langer, Pittsburgh, Pa., assignor to Westinghouse Electric Corporation, East Pittsburgh, Pa., a corporation of Pennsylvania No Drawing. Application February 28, 1955,
Serial No. 491,180

9 Claims. (Cl. 260—47)

The present invention relates to a process for curing glycidyl polyethers to form hardened resins particularly well adapted for use as electrical insulation, and to the products produced thereby.

Glycidyl polyethers, also known as epoxy resins, have excellent chemical resistance, low moisture permeability and superior adhesive properties all of which make said resins particularly well suited for use as adhesive sealing compounds, casting resins and surface coatings. Generally glycidyl polyethers have been cured to hard resins by heating the same in the presence of catalytic amounts of an amine or an acid anhydride. Numerous disadvantages have resulted from such prior art curing practices.

The amine type catalysts, such as diethylene-triamine and dimethylamine, are extremely fast acting catalysts when used in association with glycidyl polyethers. As a result, such resins must be used almost immediately after the catalyst has been admixed therewith. Any unused catalyzed resinous mixture must be discarded to prevent the same from hardening within the mixing container. Furthermore, many of the amines which have been used heretofore are toxic and volatile and certain of them have quite unpleasant odors.

Of the acid anhydride materials which may be used, maleic anhydride and phthalic anhydride have enjoyed the most widespread acceptance as curing catalysts for epoxy resins. Like the amine catalysts, however, the acid anhydrides when admixed with epoxy resins provide liquid mixtures having a relatively short shelf life. A further disadvantage of acid anhydride catalysts lies in the fact that they must be admixed with the resins at elevated temperatures to insure complete solution therein. On subsequent cooling, however, precipitation of the catalytic material frequently occurs.

The object of the present invention is to provide mixtures of glycidyl polyethers and curing catalysts comprising a borate ester and a trialkylolamine-titanate complex which mixtures are stable for prolonged periods at room temperature and will react readily at elevated temperatures to provide cured resinous products.

Another object of this invention is to provide a process for curing glycidyl polyethers by heating the same at elevated temperatures in the presence of a curing catalyst comprising a borate ester and a trialkylolamine-titanium chelated ester complex.

A still further object of this invention is to provide electrical members insulated with a resinous composition comprising the reaction product of a glycidyl polyether, a borate ester, and a trialkylolamine-titanate ester.

Object and further objects of the invention will, in part, be obvious and will, in part, appear hereinafter.

Broadly, the foregoing objects are atttained in accordance with the present invention by mixing reactive glycidyl polyethers with a curing catalytic composition comprising a borate ester and a trialkylolamine-titanate ester. The mixture is highly stable at room temperatures, yet will cure rapidly at temperatures within the range of from 100° C. to 200° C. to form hard, tough resinous products which have excellent electrical insulating properties.

More specifically, this invention provides a process which comprises admixing a glycidyl polyether with (a) from 2% to 25% by weight, based on the weight of the glycidyl polyether, of at least one borate ester having the formula

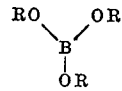

wherein R is a material selected from the group consisting of aliphatic, aromatic, and cyclic groups, and (b) from 2% to 25% by weight, based on the weight of the glycidyl polyether, of at least one trialkylolamine-titanate ester having the formula

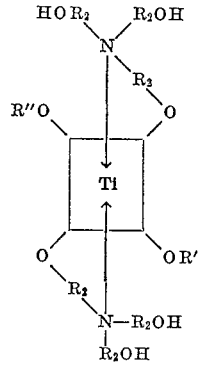

wherein $R_2$ is a bivalent alkylene radical and $R'$ and $R''$ are monovalent radicals selected from the group consisting of aliphatic and aromatic groups, and heating the mixture at temperatures within the range of from about 90° C. to about 200° C. or slightly higher to produce a hard, cured resinous product.

It is desirable to combine sufficient of the borate ester to provide about one mole of boron therefrom per mole of nitrogen in the trialkylolamine-titanate ester. However, these proportions may be departed from. Good curing has been secured when the trialkylolamine-titanate ester introduced moles of nitrogen in excess of the moles of boron from the borate ester, up to a 4:1 ratio. A substantial excess of borate ester will ordinarily not be employed because it does not produce any proportional benefit.

Mixtures of glycidyl polyethers in combination with the mixture of curing agents of this invention have extremely long shelf life at room temperatures. That is, they do not gel even after several months storage at room temperature (20–30° C.) yet will cure to the solid state after only a few hours heating at 135° C. or after having been heated to a temperature of 200° C. for a period of about one hour.

A further advantage of this invention resides in the fact that the curing catalyst comprising a borate ester and a trialkylolamine-titanate ester is a liquid which is easy to dissolve in the glycidyl polyether. In many cases, the curing catalyst mixture, since it is a liquid, helps reduce the viscosity of the glycidyl polyethers thereby permitting more complete penetration and impregnation of electrical apparatus to which the mixtures may be applied.

I have further found that the addition of piperidine or piperidine-boron trifluoride complex in small amounts of the order of 0.1% to 1% by weight of the total mixture of glycidyl polyethers plus the catalyst consisting of the borate ester and the trialkylolamine-titanate ester will greatly accelerate the curing reaction rate at elevated temperatures. Thus at 200° C., with 0.3% of the piperidine-boron trifluoride complex, the resin will gel in 5 to 10 minutes, and be fully cured in 15 minutes. The piperidine-boron trifluoride complex does not impair the room temperature tank life, though the piperidine will reduce it to about a week.

The borate esters forming a portion of the curing catalyst of this invention are well known in the art and include those materials having the following structural formula:

(I) 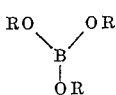

Where R may be an aliphatic radical including, for example, methyl, ethyl, propyl, isobutyl, isopropyl, butyl, and isobutyl; a cyclic group including, for example, cyclohexyl; or an aromatic group including, for example, benzyl, phenyl and methyl-phenyl. A mixture of two or three different radicals may be present in a single borate ester.

The trialkylolamine-titanium ester complex portion of the curing catalyst employed in accordance with this invention is a chelating agent well known in the art, represented by the following structural formula:

(II) 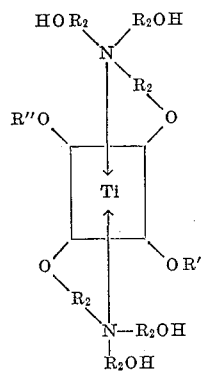

wherein $R_2$ is a bivalent alkylene radical and $R'$ and $R''$ are monovalent aliphatic groups including, for example, methyl, ethyl, propyl, isobutyl, isopropyl, butyl and isobutyl; a cyclic group including, for example, cyclohexyl; or an aromatic group including, for example, benzyl, phenyl and methyl-phenyl. These chelated titanium esters are not distillable nor are they crystallizable. They will contain a molar ratio of trialkylolamine to titanium within the range of substantially 2:1. They may be prepared by reacting one mol of a titanium ester with two mols of a trialkylolamine and distilling off two mols of the lower boiling alcohol derived from the titanium ester. As a specific example of the preparation of a chelating ester which has been found to be particularly suitable for use in accordance with this invention the following is given: One mol of tetraisopropyl titanate is reacted with two mols of triethanolamine with two mols of isopropyl alcohol being distilled off. The two remaining isopropyl groups represented by $R'$ and $R''$ in Formula II above then may be further reacted with higher boiling alcohols to replace one or two of the isopropyl groups with a higher alkyl or an aryl group. The triethanolamine titanate esters have given outstanding results.

In preparing the resinous compositions of this invention according to one preferred procedure, there is employed, a resinous polymeric epoxide or glycidyl polyether. Such epoxides or ethers may be obtained by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone. Polyhydric alcohols are glycerol, propylene glycol and 1,5-pentanediol.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

where $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

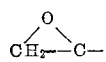

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

The 1,2 epoxide value of the glycidyl polyether is determined by heating a weighted sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The borate ester and trialkylolamine-titanate ester will dissolve readily in the glycidyl polyethers and form homogeneous compositions. The resultant solution is liquid and may be stored for several months at room temperature without any appreciable increase in viscosity. It is a particularly important feature of this invention, however, that when the catalyzed polyether mixture is subjected to elevated temperatures of from 90° C. to 200° C. and higher, the liquid polyether-catalyst mixture readily reacts to form a hard, tough, cured resinous product. Such products exhibit low electrical losses over substantially all temperatures at which such apparatus operates.

Glycidyl polyethers catalyzed with the curing catalyst mixture of this invention are particularly suitable for electrical insulating applications. Thus, solutions of the glycidyl polyethers and curing catalysts may be applied to electrical wires, cables, coils, windings and the like as potting, impregnating and coating resins and varnishes. Upon being subjected to heat, any solvent which may be present in the polyether-curing catalyst mixture evaporates and the liquid polyether cures to a hard, tough resinous mass. These catalyzed glycidyl polyether compositions also may be employed for potting and casting applications. Laminated magnetic cores, for example, may be dipped in such liquid compositions, using vacuum and pressure if necessary, and the composition will readily fill all of the spaces between laminations. On heating, the composition between the laminations cures to a hard, tough, adhesive binder holding the laminations in position to produce a solid core which is extremely resistant to delamination and may be cut into core segments without rupture. Electrical transformers, rectifiers and electronic components of various kinds may be potted or cast within the completely reactive catalyzed glycidyl polyether compositions of this invention.

The compositions comprising the epoxy resin, and the borate ester and trialkylolamine-titanate esters are excellent adhesives. Thin coatings may be applied to metal, wood, porcelain, paper, plastics such as phenolic laminates, and when the coated surfaces are superimposed under moderate pressures and heated to temperatures of 90° C. to 200° C. unusually good bonds are obtained. Steel plates cemented with these compositions and cured at 150° C. for two hours required 17,000 pounds on an area of 5.25 sq. inches in shear to rupture the bond.

Glycidyl polyethers which are cured using the catalytic mixtures of this invention may be admixed with solids such as silica, titanium dioxide, glass fibers, wood flour, mica, graphite and calcium silicate. In some instances small amounts up to 50% of the weight of the composition of other resins, such as phenolics, polyesters such as glycol maleates, and alkyd resins, may be admixed with the glycidyl polyethers in the practice of the present invention.

In order to indicate more specifically the advantages and capabilities of the curing catalytic mixture of the present invention, the following specific examples are set forth. The parts given are by weight unless otherwise indicated.

*Example I*

A glycidyl polyether is prepared by introducing into a reaction vessel equipped with agitator, cooling and heating means, distillation condenser and receiver, 513 parts (2.25 mols) of bis-phenol [2,2-bis(4-hydroxyphenyl) propane] and 208.1 parts (22.5 mols) of epichlorohydrin and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin is removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin and then being added to the filtrate and both returned to the vessel. The benzene is then distilled off, the polyether resin being heated at an increasing temperature until at 125° C. vacuum is applied and distillation is continued until the vessel contents are at 170° C. at 25 mm. of mercury absolute pressure. The glycidyl polyether had a viscosity of Z–3 on the Gardner-Holdt scale.

To 200 parts of the glycidyl polyether thus prepared there was added a mixture comprising 11.8 parts of butyl borate and 10.8 parts of isopropyl triethanolamine-titanate complex. The viscosity of the resulting mixture was W on the Gardner-Holdt scale. On standing at room temperature for one month the catalyzed glycidyl polyether only attained a viscosity of Y on the Gardner-Holdt scale. The catalyzed mixture gelled in less than one hour at 200° C. and at six hours when heated at 135° C. All samples attained a Shore hardness of 85 on the "D" scale within three hours after gelling. After further curing at 135° C. for 24 hours the resins had electrical properties as indicated at A, while after an additional 24 hours at 135° C., the properties were as indicated at B, below:

| Test Temp. | | 100×tan δ | | Dielectric Constant | |
|---|---|---|---|---|---|
| | | 60 Cy. | 1 Kcy. | 60 Cy. | 1 Kcy. |
| A | 25° C | 1.49 | 0.91 | 3.77 | 3.68 |
| | 100° C | 5.64 | 1.76 | 5.27 | 5.15 |
| | 150° C | 63.6 | 7.56 | 6.03 | 4.79 |
| B | 25° C | 0.24 | 0.27 | 3.59 | 3.58 |
| | 100° C | 2.75 | 3.49 | 4.79 | 4.52 |
| | 150° C | 2.65 | 0.82 | 4.77 | 4.73 |

Example II

A solution was made up in accordance with the procedure described in Example I except that there was used a glycidyl polyether prepared by reacting 2.6 mols of epichlorohydrin with one mol of bisphenol in the presence of 1.1 mols of sodium hydroxide per mol of epichlorohydrin following the procedure of Example I of U. S. Patent No. 2,548,447. The polyether had an original viscosity of Z-6 on the Gardner-Holdt scale, which viscosity dropped to Y upon addition of the catalytic mixture. The catalyzed resin did not return to its original viscosity of Z-6 until after standing for two months at room temperature. It gelled in less than one-half hour at 200° C., and after 3½ hours after having been heated at 135° C. After being heat-treated for 48 hours at 135° C., the cast resin had the following electrical properties:

| Test Temp. | 100×tan δ | | Dielectric Constant | |
|---|---|---|---|---|
| | 60 Cy. | 1 Kcy. | 60 Cy. | 1 Kcy. |
| 25° C | 0.26 | 0.38 | 3.52 | 3.51 |
| 100° C | 2.51 | 1.68 | 3.97 | 3.82 |
| 150° C | 4.72 | 1.22 | 4.67 | 4.62 |

Example III

A mixture of 100 parts of the glycidyl polyether prepared in accordance with the procedure described in Example II were admixed with 3.7 parts of methanol-methyl borate azeotrope (68% being methyl borate) and 5.4 parts of isopropyl-triethanolamine-titanate ester. The catalyzed mixture gelled in less than one-half hour at 200° C. The catalyzed resin when cured had a Shore hardness of 85 on the "D" scale after three hours at 135° C. After 24 hours heating at 135° C., the electrical properties of the cured resin were as follows:

| Test Temp. | 100×tan δ | | Dielectric Constant | |
|---|---|---|---|---|
| | 60 Cy. | 1 Kcy. | 60 Cy. | 1 Kcy. |
| 27° C | 0.28 | 0.52 | 3.49 | 3.49 |
| 101° C | 1.47 | 0.99 | 3.91 | 3.82 |
| 152° C | 1.99 | 1.48 | 4.89 | 4.81 |

Example IV

To 100 parts of the glycidyl polyether prepared as described in Example II there was added 7.9 parts of cyclohexyl borate at a temperature of 105° C. After cooling to 40° C., 5.4 parts of isopropyl triethanolamine-titanate ester were added to the mixture. The resultant solution gelled after heating at 200° C. for one hour. It had a Shore hardness of 85 on the "D" scale within three hours. After heating 24 hours at 135° C., the electrical properties of this cured resin were as follows:

| Test Temp. | 100×tan δ | | Dielectric Constant | |
|---|---|---|---|---|
| | 60 Cy. | 1 Kcy. | 60 Cy. | 1 Kcy. |
| 27° C | 0.32 | 0.32 | 3.51 | 3.49 |
| 101° C | 3.64 | 3.21 | 4.41 | 4.14 |
| 152° C | 4.64 | 0.82 | 4.51 | 4.46 |

Example V

A solution of 200 parts of the glycidyl polyether resin prepared as described in Example II, 16.9 parts of tri-m-cresyl borate and 10.8 parts of isopropyl triethanolamine-titanate ester gelled when heated to 200° C. for 30 minutes. Similar samples of this catalyzed resin gelled after heating to 135° C. for 2½ hours and at 105° C. after heating for four hours. The catalyzed but uncured polyether changed in viscosity only from Z-3 to Z-6 on the Gardner-Holdt scale after aging five weeks at room temperature. After heating for 24 hours at 135° C., the cured resin had the following electrical properties:

| Test Temp. | 100×tan δ | | Dielectric Constant | |
|---|---|---|---|---|
| | 60 Cy. | 1 Kcy. | 60 Cy. | 1 Kcy. |
| 26° C | 0.31 | 0.41 | 3.42 | 3.41 |
| 100° C | 3.21 | 2.30 | 4.00 | 3.78 |
| 150° C | 2.31 | 0.98 | 4.32 | 4.33 |

Example VI

A small transformer was impregnated with a quantity of the catalyzed polyether mixture prepared as described in Example V. Prior to introduction into the epoxy resin, the catalytic mixture of tri-m-cresyl borate and isopropyl triethanolamine-titanate ester was heated at a temperature of from 130 to 185° C. until vapors of low boiling isopropyl alcohol ceased coming off. This obviated the possibility of bubbles forming subsequently in the transformer during impregnation and baking. The heat-treated catalytic mixture then was admixed with the glycidyl polyether and the composition was applied to the transformer in an impregnation tank under pressure. After curing at a temperature of 135° C. for about three hours, and 3 hours at 120° C., the transformer was completely impregnated with a tough, hard resin having excellent electrical insulating properties.

Example VII

One mol (107 grams) of a commercial mixture of ortho, meta, and paracresol was added to ½ mol (231 grams) of isopropyl triethanolamine-titanate complex. The mixture was heated, with stirring and nitrogen sparging, up to a temperature of 160° C. with a total of about 60 grams of isopropyl alcohol distilling from the mixture. A mixture of 55.8 parts of the cresyl triethanolamine-titanate ester thus prepared and 66.4 parts of cresyl borate were combined with stirring. Ten parts of this ester mixture then were admixed with 100 parts of glycidyl polyether prepared as described in Example II. The liquid mixture gelled to a hard, tough solid resin after being heated to a temperature of 150° C. for one hour to yield a clear, light brown casting.

The mixture of Example VII is a particularly useful catalyst. The cresyl borate and cresyl-triethanolamine titanate complex may be prepared at any time, stored and can be added to the epoxy resin whenever desired. It is a stable fluid.

Example VIII

To the catalyzed composition of Example II there was added 0.5% by weight of piperidine. The resulting epoxy resin composition gelled in less than 10 minutes at 200° C., and gelled in less than 25 minutes at 105° C.

The glycidyl polyether-catalytic mixtures of this invention are useful as casting resins, mica bonds, surface coatings, moldings, adhesives, sealants, resin products generally, and insulation of all kinds for electrical equipment.

While the present invention has been described with reference to particular embodiments thereof, it will be understood, of course, that certain changes, modifications and substitutions may be made therein without departing from its scope.

I claim as my invention:

1. A composition of matter comprising (1) a reactive glycidyl polyether derived from a dihydric phenol and an epihalohydrin and (2) a curing catalyst therefor comprising a mixture of (a) from 2% to 25% by weight, based on the weight of the polyether, of at least one borate ester having the formula

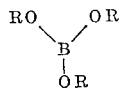

wherein R is selected from the group consisting of aliphatic, aromatic, and cyclohexyl groups and (b) from 2% to 25% by weight, based on the weight of the polyether, of at least one trialkyloamine-titanate ester having the formula

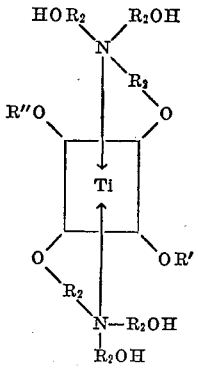

wherein $R_2$ is a bivalent alkylene radical and R' and R" are selected from the group consisting of aliphatic and aromatic groups.

2. A composition of matter as set forth in claim 1 wherein the mole ratio of trialkylolamine to titanium in the ester is 2:1.

3. A composition of matter as set forth in claim 1 which contains from 0.1% to 1% by weight of piperidine based on the total weight of the glycidyl polyether plus the curing catalyst.

4. A composition of matter comprising a reactive glycidyl polyether of a dihydric phenol and an epihalohydrin, said polyether having a 1,2-epoxy equivalency of greater than 1, having admixed therein about 2% to 25% by weight, based on the weight of the polyether, of at least one borate ester having the formula

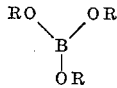

wherein R is selected from the group consisting of aliphatic, aromatic, and cyclohexyl groups, and from 2% to 25% by weight, based on the weight of the polyether, of at least one triethanolamine-titanate ester having the formula

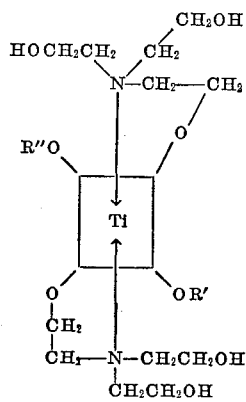

wherein R' and R" are selected from the group consisting of aliphatic and aromatic groups.

5. The process of producing a resinous product which comprises admixing a glycidyl polyether of a dihydric phenol and an epihalohydrin with from 2% to 25% by weight, based on the weight of the polyether, of at least one borate ester having the formula

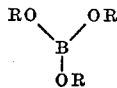

wherein R is selected from the group consisting of aliphatic, aromatic, and cyclohexyl groups, and from 2% to 25% by weight, based on the weight of the polyether, of at least one triethanolamine-titanate ester having the formula

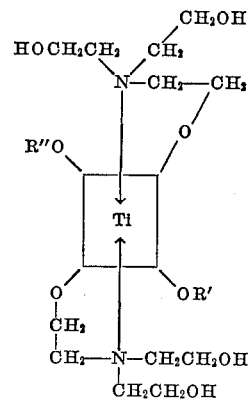

wherein R' and R" are selected from the group consisting of aliphatic and aromatic groups, and heating the mixture at temperatures within the range of from about 90° C. to about 200° C. to produce a hard, cured resinous product.

6. The process of claim 5 wherein the glycidyl polyether is the product obtained by reacting 2,2-bis (4-hydroxyphenyl) propane and epichlorohydrin in an alkaline medium.

7. The cured, resinous product produced by the process of claim 5.

8. An insulated electrical member comprising an electrical conductor and cured, resinous insulation applied to the conductor, the resinous insulation comprising the reaction product of a glycidyl polyether of a dihydric phenol and an epihalohydrin, said polyether having a 1,2-epoxy equivalency greater than 1, and from 2% to 25% by weight, based on the weight of the polyether, of at least one borate ester having the formula

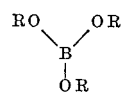

wherein R is selected from the group consisting of aliphatic, aromatic, and cyclohexyl groups, and from 2% to 25% by weight, based on the weight of the polyether, of at least one triethanolamine-titanate ester having the formula

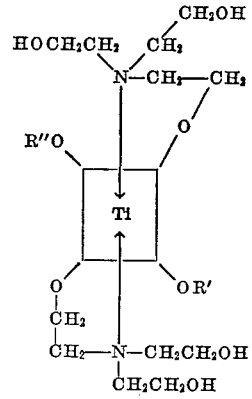

wherein R' and R" are selected from the group consisting of aliphatic and aromatic groups.

9. An insulated electrical member as set forth in claim 8 wherein the resinous insulation contains finely divided inorganic filler material.

No references cited.